April 14, 1970 S. COLE 3,506,193
FLUID FLOW DAMPER ARRANGEMENT

Filed April 18, 1968 2 Sheets-Sheet 1

INVENTOR.
Saxon Cole
BY Edward M. Steutimann
ATTORNEY

United States Patent Office 3,506,193
Patented Apr. 14, 1970

3,506,193
FLUID FLOW DAMPER ARRANGEMENT
Saxon Cole, Shrewsbury, Mo., assignor to American Air Filter Company, Inc., Louisville, Ky., a corporation of Delaware
Filed Apr. 18, 1968, Ser. No. 722,480
Int. Cl. G05d 23/08, 23/00
U.S. Cl. 236—38          5 Claims

ABSTRACT OF THE DISCLOSURE

A damper arrangement for controlling fluid flow which includes damper means rotatably mounted on a shaft for free rotation relative thereto and a temperature responsive element connected to the shaft and the damper so the damper is rotated by rotation of the damper shaft and is likewise rotated, independently of the rotation of the shaft, by the temperature responsive element to compensate for change in temperature of the fluid. The damper shaft can be rotated by selected means and multiple damper assemblies can be interconnected to cooperatively modulate fluid flow through different passages in response to change in the selected conditions.

BACKGROUND OF THE INVENTION

Dampers operated by rotatable damper shafts have previously been provided to modulate flow of fluid in accordance with change in a selected condition but in most such damper arrangements the damper has been rigidly fixed to the rotatable shaft which is moved in response to the changed condition. In such arrangements the shaft is rotated in response to change in a selected condition and the damper is moved accordingly without reference to change in any other condition. More particularly, such previous damper arrangements have not included means to reposition the damper independently of the damper shaft in response to change in temperature of the fluid controlled by the damper.

SUMMARY OF THE INVENTION

The present invention provides a versatile damper assembly to control flow of fluid, for example air, through a conduit where the damper is freely rotatable about a damper shaft and a temperature responsive element, responsive to change in temperautre of the fluid, is connected to the damper and the damper shaft for secondary adjustment of the damper independent of the position of the damper shaft.

In one application the present invention provides a damper assembly to control flow of a stream of air including interconected dampers disposed in different passages to apportion air flow through the passages in accordance with change in temperautre of the air stream.

Various other features of the present invention will become obvious to those skilled in the art upon reading the disclosure set forth hereinafter.

More particularly, the present invention provides a damper arrangement including: a rotatable damper shaft; damper blade means mounted on the shaft for free rotation about the shaft; and, temperature responsive means connected to the damper shaft and to the damper blade means so the damper is rotated with the damper shaft and is rotated independent of the shaft by change in configuration of the temperature responsive element in response to change in temperature of the element.

Damper assembly means in accordance with the present invention can be included in apparatus comprising: conduit means having a first air flow passage and a second air flow passage; first damper assembly means disposed within the first air flow passage including a rotatable shaft disposed within the passage, first damper means attached to the first shaft and freely rotatable thereon, and a first temperature responsive means attached to the first damper means and the first rotatable shaft so the first damper means is rotated with rotation of the first damper shaft and is rotated relative to the first damper shaft in response to change in temperature of the first temperature responsive element; a second damper assembly means, disposed within the second air flow passage of the conduit, including a second rotatable shaft, a second damper blade attached to the second shaft and freely rotatable about the shaft, and a second temperature responsive element connected to the second shaft and the second damper blade so the second damper blade is rotated with rotation of the second shaft and is rotated relative to the second shaft in response to change in temperature of the second temperature responsive element; damper linkage means connected at one end to the first damper blade and at a second end to the second shaft so the second shaft is rotated in response to movement of the first damper blade; and, means to rotate the first rotatable shaft in response to change in a selected condition.

It is to be understood that the description of one example of the present invention given hereinafter is not by way of limitation and that various changes can be made in the arrangement, form, or configuration of the apparatus disclosed without departing from the scope or spirit of the present invention.

Referring now to the figures which show one example of an apparatus in accordance with the present invention:

The figures show an example of a damper arrangement, including examples of damper assemblies, in accordance with the present invention to control air flow in a heat exchange unit of an air heater where a motive fluid is circulated through a closed circuit to be vaporized and condensed to provide power to the system and heat to an air stream.

Figure 1:
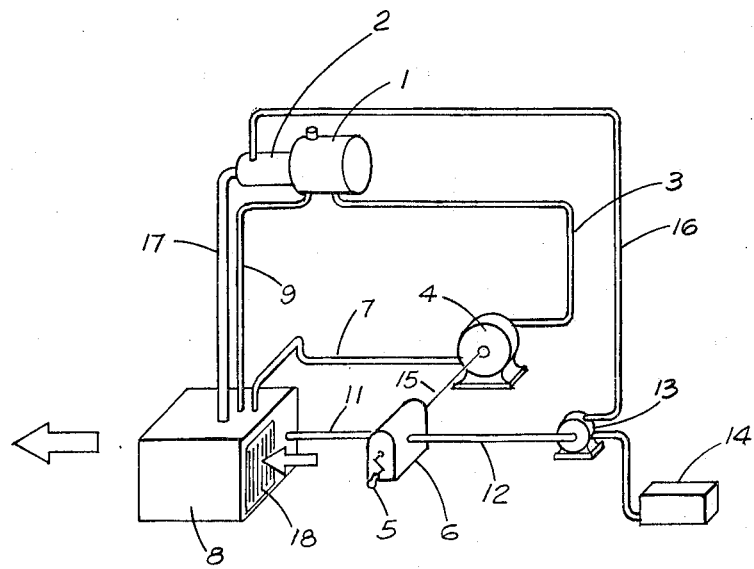
FIGURE 1 is a schematic diagram of an air heater used to illustrate one example of a damper arrangement in accordance with the present invention.

The heater, as shown in FIGURE 1, includes a boiler 1 heated by a combustor 2 to vaporize the motive fluid. A conduit 3 is provided to supply the vaporized fluid from boiler 2 to a power generating means, for example a turbine 4, which supplies mechanical power for operation of associated heater elements, as hereinafter described. The power is transmitted from turbine 4 to a power receiving and transmitting means, for example a cooperative gear train 6, by a drive shaft 15. Fluid exhausted from turbine 4 passes through conduit 7 to an air heater unit 8, hereinafter described, where a portion of the sensible and latent heat of the fluid is transferred to an air stream passing through the heat exchange assembly. Cooled motive fluid is emitted from the air heater unit and returned to boiler 1 by means of conduit 9.

Gear train 6 is connected to a shaft 11 adapted to drive an air moving means, for example a fan 31, (FIGURE 2) disposed to direct a stream of air through the air heater unit 8. A second shaft 12 is provided to transmit power from gear train 6 to a fuel pump 13 which provides fuel for combustion 2 from a fuel tank 14 provided to supply fuel to the combustor. The gear train includes a hand crank 5 to be used during starting of the heater circuit, as hereinafter described.

A louvered air inlet opening 18 is provided in heater unit 8 for admission of the air stream to be heated. A portion of the air admitted to heat exchange unit 8 is supplied to the combustor 2 through conduit 25 to be consumed as combustion air while the rest of the air stream can be emitted through an outlet opening 29 (FIGURE 2) to be space to be heated.

Figure 2:
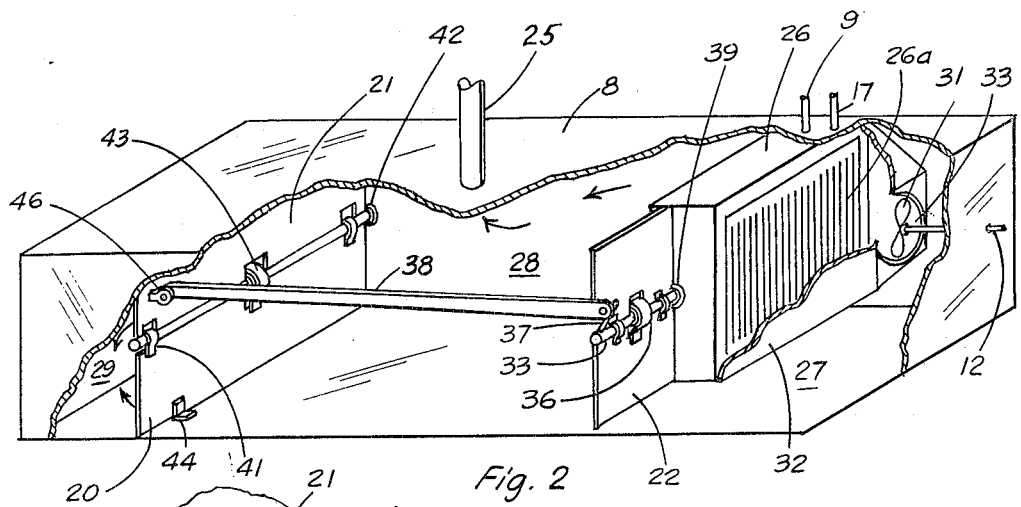
FIGURE 2 is a view of a heat exchanger unit including an example of a damper arrangement in accordance with the present invention.

Referring to FIGURE 2, which shows an enlarged view in section of the air heater unit 8, a heat exchanger 26 is disposed in the air heater unit alongside a damper 22 to define an air inlet chamber 27 which communicates with air inlet louver 18, as shown in FIGURE 1. Another damper assembly 20–21, as hereinafter described, is disposed downstream of heat exchanger 26 so a warm air circulating chamber 28 is defined between damper assembly 20–21 and upstream heat exchanger 26 and damper 22. Damper assembly 20–21 is provided to control flow of air through outlet 29 at the end of casing 8 opposite inlet 18.

Motive fluid 17 and motive fluid outlet 9 are connected to heat exchange 26 so that heated motive fluid flows through conduits (not shown) in heat exchanger 26 and air passing through the heat exchanger is directed over extended surfaces 26a joined in heat transfer relation with the conduits to facilitate heat transfer from the motive fluid to the air stream to be heated. Air emitted from heat exchanger 26 flows into warm air circulating chamber 28 and a part of the air is emitted through conduit 25 to provide combustion air to combustor 2.

As shown, fan 31 is driven by shaft 12 connected to gear train 6 and the fan is located to direct a stream of air to be heated over heat exchanger 26. To facilitate recirculation of air from chamber 28 to heat exchanger 26, as hereinafter described, a semi-enclosed hood 32 is provided to control flow of air to heat exchanger 26 and a cooperative opening 33 is located in the hood to receive fan 31.

Figure 4:
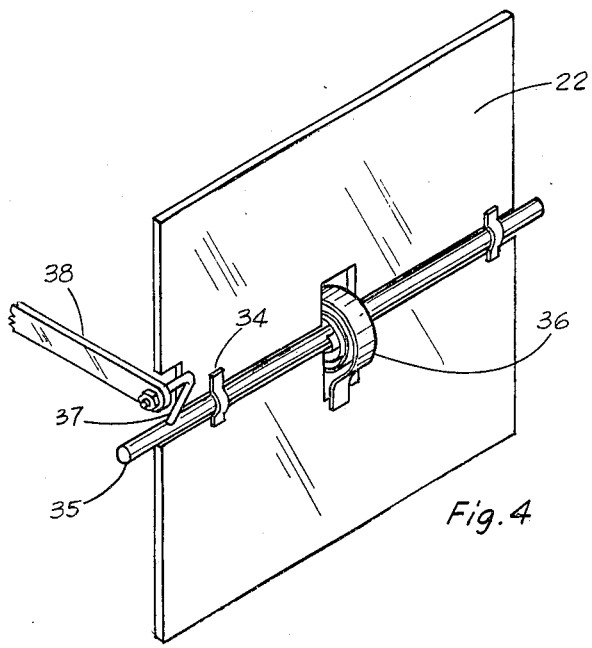
FIGURE 4 is an illustration of one damper assembly in accordance with the present invention; and, FIGURE 5 is a view of another example of a damper assembly in accordance with the present invention.

Referring to FIGURE 4 which shows an enlarged view of an example of a damper 22, as shown in FIGURE 2, the damper is mounted on a damper shaft 35 by brackets 34 which, advantageously, do not bind the shaft to the damper so the damper can be rotated freely in the shaft. In accordance with one feature of the present invention a temperature responsive element, for example a coiled bimetal strip 36, is provided and is connected at opposite ends to shaft 35 and damper blade 22, respectievly, so that rotation of the shaft causes rotation of bimetal element 36 and damper 22. In accordance with one feature of the present invention a change in temperature of bimetal element 26, which can be the result of change in temperature of the air surrounding the bimetal element, will cause a change in the configuration of the bimetal element and in the application shown in FIGURE 4 such temperature change will rotate damper 22 independent of rotation of shaft 35. The direction of rotation of the damper blade relative to the damper shaft is, of course, dependent on the configuration of the temperature responsive element, the way the element is attached to both the damper and the shaft, and the direction of the temperature change and suitable modifications can be made in assembly depending on the proposed application of the damper assembly. In most applications bimetal element 36 is advantageously connected to damper 22 to cause rotation of the damper in different directions, relative to shaft 35, in response to increase and decrease in air temperature.

Figure 5:
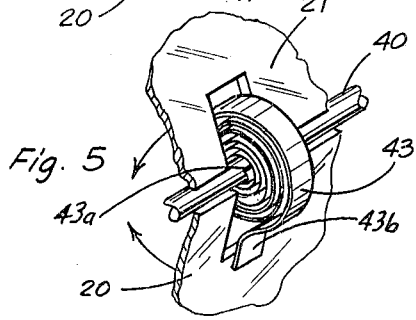

Referring to FIGURES 2 and 5, dampers 20 and 21 in accordance with the present invention are mounted on a shaft 40 which is disposed across heater unit 8 and journaled in bearings 42 on opposite sides of the unit. In the example of the figures damper 21 is rigidly fixed to shaft 40 while damper 20 is fixed to shaft 20 by means of fasteners 41 which loop around the damper shaft and, advantageously, the internal diameter of each fastener is larger than the diameter of shaft 40 so the fasteners are free to move on the shaft to provide free rotation of damper 20 relative to shaft 40. A temperature responsive element, for example, bimetallic element 43 as shown in FIGURE 5, is fixed at one end 43a to shaft 40 and the opposite end 43b is fixed to damper 20. A stop 44 is provided, as shown, to limit movement of damper 20 in a counterclockwise direction and a similar stop (not shown) is provided to contact damper 21 to limit movement of damper 21 in a clockwise direction.

The configuration shown in FIGURE 2, where the dampers are in vertical air flow blocking relation, corresponds to the "cold" position when the air in chamber 28, and the temperature of bimetal elements 36 and 43, is below a selected temperature.

A linkage arm 38 is provided to interrelate movement of fixed damped 21 and damper shaft 35. The linkage is connected to damper 21 by means of a pivotable fastener 46 as shown and is connected to shaft 35 by means of an arm 37 at a pivotable connection 37a (FIGURE 4).

Figure 3A:
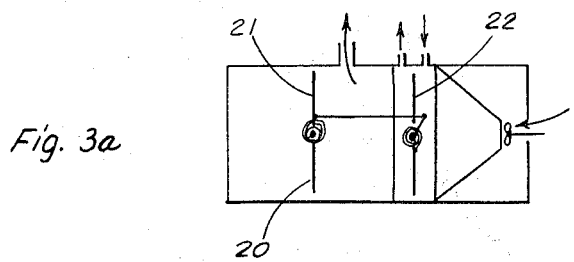
FIGURES 3a, 3b and 3c are a series of schematic illustrations of operation of one example of a damper arrangement in accordance with the present invention.

Operation of the heater apparatus of the example of FIGURE 1 is initiated by turning crank 5 manually to rotate fan 31 to provide cold air to chamber 28 and consequently air flow to the unit is very low during startup. Operation of the heater unit is usually initiated when the temperature in chamber 28 of heater unit 8 is below a selected minimum so, as shown in FIGURE 3a, dampers 20–21 and damper 22 are in vertical, air blocking, relation and all air admitted to chamber 28 passes through conduit 25 to provide combustion air to combustor 2.

It will be noted that crank 5 likewise operates fuel pump 13 to supply fuel to combustor 2 but at a relatively low rate.

After ignition of a flame in combustor 1 motive fluid is heated in boiler 2 and vaporized motive fluid flows to turbine 4. As additional heat is supplied to boiler 1 the rate of vaporization of motive fluid is increased and after a period of operation the power generated by the turbine 4 is sufficient to operate fan 31 and pump 13 without use of the hand crank. The temperature of the motive fluid supplied to the heat coil increases with an increase in the rate of vaporization and the temperature of the air stream flowing past heat exchanger 26 increases accordingly.

Figure 3B:
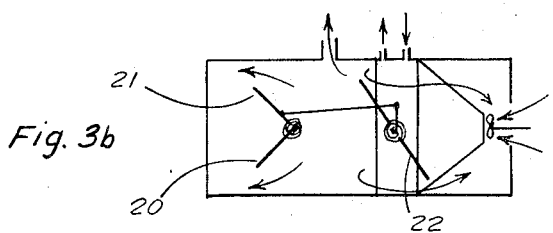

Referring now to the schematic diagram of operation of the heater as shown in FIGURES 3b and 5, as the temperature of the air passing through heat exchanger 26 is increased the temperature of bimetal element 43 is increased so the bimetal element is elongated to permit clockwise movement of damper 20 and corresponding counterclockwise movement of damper 21 as hereinafter described. It will be noted that rotation of dampers 20–21 toward the open position results from a combination of forces which includes the kinetic force of the air passing through chamber 28, which urges damper 20 in a clockwise direction and damper 21 in a counterclockwise direction, as well as the forces associated with the elongation of bimetal element 43 as a result of increased temperature which also urges damper 20 in a clockwise direction and causes a reactive force which urges shaft 40, and damper 21, in a counterclockwise direction. Bimetal element 43 can be selected so that so long as the temperature of the air in chamber 28 is below a selected minimum the bimetal element 43 is in tension and urges damper 20 toward a counterclockwise air flow blocking position and the reactive force associated with the tension in element 43 urges shaft 40 and damper 21 in a clockwise direction so the dampers are retained against damper stop 44 in a vertical, air flow blocking, position. In the example of the figures bimetal element 43 is elongated in response to increasing temperature and when the temperature of the air in chamber 28, and therefore the temperature of bimetal element 43, reaches a selected minimum the tension force acting on the damper assembly is released because of elongation or other change in configuration of the element. At this point the kinetic force of the air stream impinging on the damper assembly urges the dampers to open position and a further increase in temperature results in further elongation of the bimetal element so dampers 20 and 21 are opened as shown in FIGURE 3b.

Figure 3C:
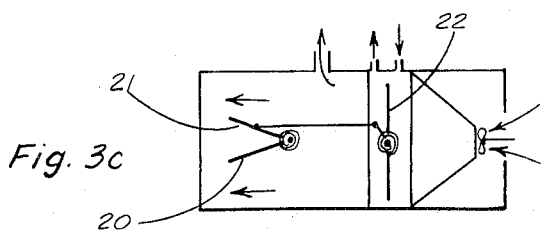

Referring to FIGURES 2 and 3b damper 22 is connected to damper 21 and is rotated to open position through linkage 38, as hereinafter described, in response to movement of damper 21. When damper 22 is opened during the startup of the heater, warm air is recirculated from chamber 28 to chamber 27 and substantially increases the temperature of the air passed over heat exchanger 26 and speeds the increase in temperature in chamber 28. Rapidly increasing temperature in chamber 28 is desirable and recirculating a portion of the warm air is desirable in the application shown, because warm combustion air supplied to combustor 2 increases the operating efficiency of the combustor and decreases the time interval required to achieve operation at peak capacity. As the heater approaches peak capacity, the temperature in chamber 28 increases so the quantity of recirculated air necessary for satisfactory operation is decreased and, advantageously, bimetal element 36 of damper 22 is elongated to urge damper 22 in a clockwise direction to decrease the amount of air recirculated to chamber 27. At peak operating capacity damper 22 is returned by bimetal element 36, to a vertical position to prevent recirculation of air so that all of the air drawn into heat exchange assembly 8, except for the portion which is supplied to combustor 25, is emitted through outlet 29, and, as shown in FIGURE 3c, dampers 20 and 21 are in an open position to provide a maximum flow through outlet 29.

While the examples of the damper assemblies and damper arrangement in accordance with the present invention are described herein with reference to a heater arrangement it will be appreciated that other applications and various modifications will occur to those skilled in the art and it is to be understood that the embodiments shown are only intended to be illustrative in nature. It is, therefore, to be understood that the description and modifications shown should not be considered limiting except as to be commensurate in scope with the appended claims.

The invention claimed is:

1. A damper-assembly comprising: a first damper assembly including a first rotatable shaft means having a first damper attached to said first shaft; a second damper assembly including a second rotatable shaft, a second damper blade attached to said second shaft and freely rotatable about said shaft, and a temperature responsive element connected to said second shaft and said second damper blade so said second damper blade is rotated with rotation of said second shaft and is rotated relative to said second shaft in response to change in temperature of said temperature responsive element; damper linkage means connected at one end to said first damper assembly and at a second end to said second damper assembly so said second shaft is rotated in in response to movement of said first damper blade; and means to rotate the first rotatable shaft in response to change in a selected condition.

2. A damper assembly comprising: a first rotatable shaft means having a first damper fixed thereto for rotation with said first rotatable shaft, second damper means attached to said first shaft and freely rotatable thereon, and a first temprature responsive means attached to said second damper means and said first rotatable shaft so said second damper means is rotated with rotation of said first damper shaft and is rotated relative to said first damper shaft in response to change in temperature of said first element; a second damper assembly having a second rotatable shaft, a third damper blade attached to said second shaft and freely rotatable about said shaft, and a second temperature responsive element connected to said second shaft and said third damper blade so said third damper blade is rotated with rotation of said second shaft and is rotated relative to said second shaft in response to change in temperature of said second temperature responsive element; damper linkage means connected at one end to said first damper blade and at a second end to said second shaft so said second shaft is rotated in response to movement of said first damper blade; and means to rotate the first rotatable shaft in response to change in a selected condition.

3. The apparatus of claim 2 wherein said first damper assembly is disposed within a fluid flow passage to control flow of gas through said first fluid flow passage and said second damper assembly is disposed within a second passage, communicating with said first air flow passage, to control flow of air through said second air flow passage wherein said air flow is apportioned between said first and second air flow passages in accordance with the position of said first and second damper assemblies.

4. The apparatus of claim 2 wherein said first damper assembly includes stop means to limit movement of said first and second damper means in selected directions at temperatures less than a selected minimum and said temperature responsive element is in tension below said selected minimum temperature to urge said first and second damper means against said stop means.

5. An air heat exchange conduit comprising a casing having air inlet and an air outlet, heat exchange means disposed in said air flow conduit; air propulsion means disposed to direct a stream of air from said casing air inlet through said heat exchange means; first damper assembly disposed to block air flow through said air outlet of said casing including a rotatable shaft disposed within said casing, first damper means fixed to the said first rotatable shaft for rotation with said first shaft, second damper means attached to said first shaft and freely rotatable thereon, and a first temperature responsive means attached to said second damper means and said first rotatable shaft so said second damper means is rotated with rotation of said first damper shaft and is rotated relative to said first damper shaft in response to change in temperature of said first temperature responsive element; second damper assembly disposed within said casing to block air flow from the outlet of said heat exchange means to the inlet of said heat exchange means including a second rotatable shaft, a third damper blade attached to said second rotatable shaft and freely rotatable about said shaft, and a second temperture responsive element connected to said second shaft and to said third damper blade so said third damper blade is rotated with rotation of said second shaft and is rotated relative to said second shaft in response to change in temperature of said second temperature responsive element; damper linkage means connected at one end to said first damper blade and at a second end to said second shaft so said second shaft is rotated in response to movement of said first damper blade; and, means to rotate said first rotatable shaft in response to change in a selected condition.

References Cited

UNITED STATES PATENTS

| | | | |
|---|---|---|---|
| 1,452,792 | 4/1923 | Cooper | 236—93 |
| 1,659,875 | 2/1928 | Jacobs | 236—93 |

EDWARD J. MICHAEL, Primary Examiner

U.S. Cl. X.R.

236—93